(No Model.) 2 Sheets—Sheet 1.

L. B. GREER.
RECIPROCATING ENGINE.

No. 252,579. Patented Jan. 17, 1882.

Attest:
Herm. Lauten
Andrew J. Henderson

Inventor:
Laughlin B. Greer
By Wm. C. Henderson
Attorney.

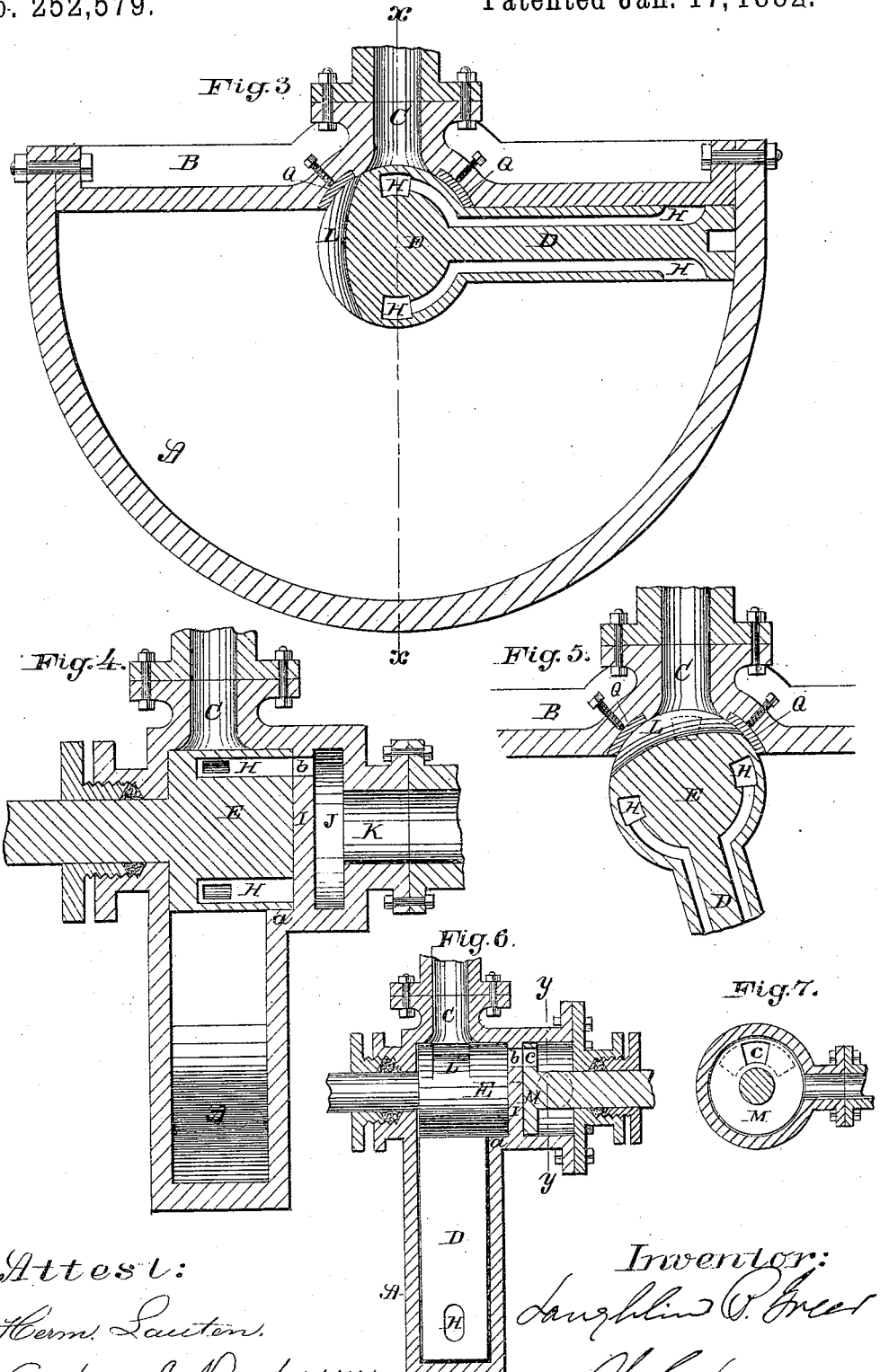

UNITED STATES PATENT OFFICE.

LAUGHLIN B. GREER, OF WASHINGTON, D. C., ASSIGNOR TO C. F. KEYS, MARCUS GREER, AND CHAUNCEY F. GREER, ALL OF SAME PLACE.

RECIPROCATING ENGINE.

SPECIFICATION forming part of Letters Patent No. 252,579, dated January 17, 1882.

Application filed June 3, 1881. (No model.)

*To all whom it may concern:*

Be it known that I, LAUGHLIN B. GREER, a citizen of the United States, residing at Washington city, District of Columbia, have invented a new Reciprocating Steam-Engine, of which the following is a specification.

My invention relates to a reciprocating steam-engine which consists of a semicircular cylinder containing an oscillating hollow piston, with two induction steam-ports, which allow the steam to pass through and to the end of the hollow piston, where it enters the steam-chamber, and there exhausts through the exit-ports of the cylinder, caused by the movement of the hollow piston. I attain these objects by the mechanism illustrated in the accompanying drawings, in which—

Figure 1:
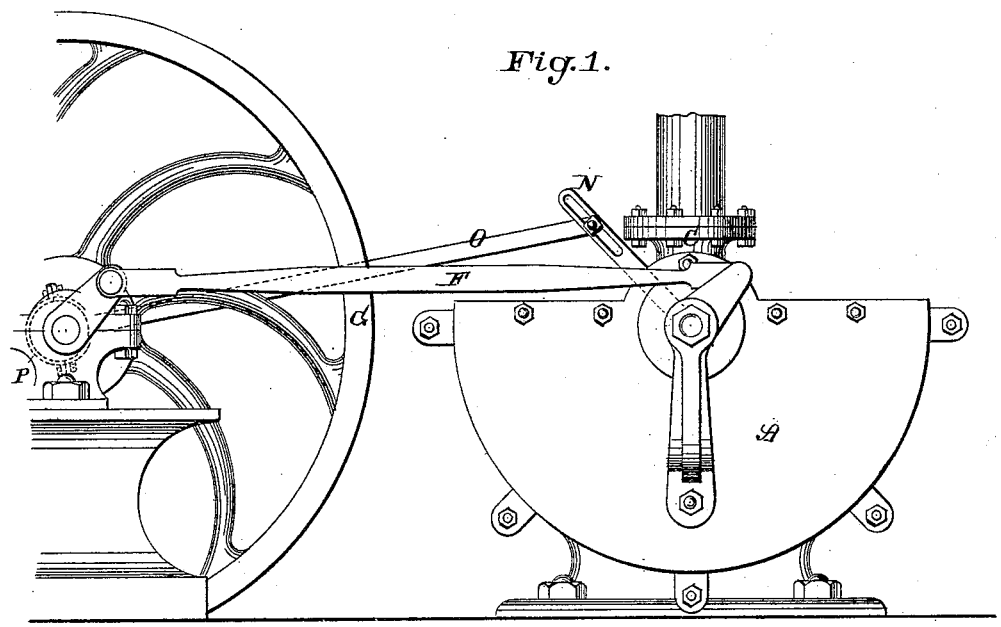
Figure 2:
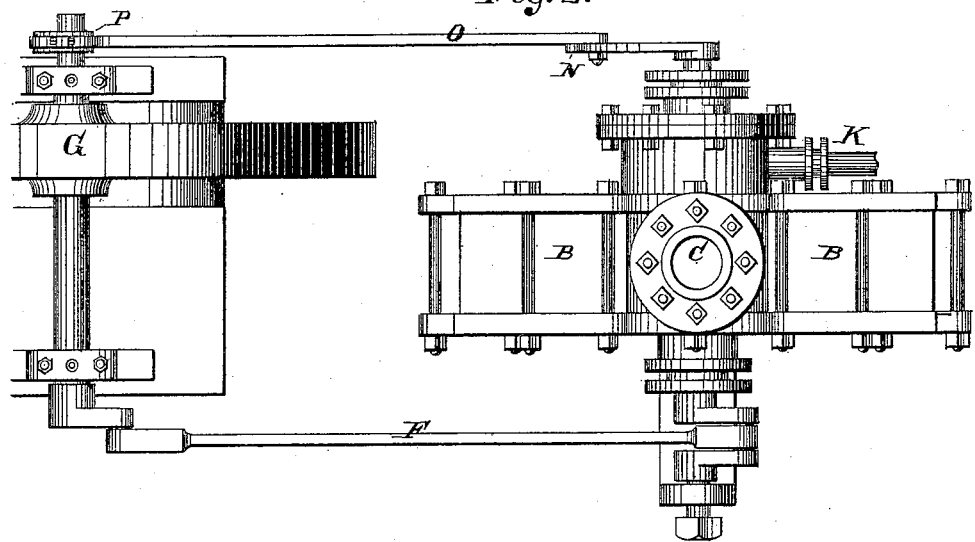

Figure 1 is a side elevation of the engine; Fig. 2, a plan thereof; Fig. 3, a section through the steam-cylinder; Fig. 4, a cross-section on the line *x x* of Fig. 3; Fig. 5, a section on the same line as Fig. 3, with the piston in a different position. Fig. 6 is a cross-section through the steam-cylinder on the line of the rock-shaft of the piston, showing the application of a disk to control the steam-induction port, and Fig. 7 a section through the same figure on the line *y y* of Fig. 6.

My invention relates to steam-engines in which is employed an oscillating piston; and it consists in forming the induction and exhaust ports in the oscillating piston so that the steam will pass through the piston into the steam-cylinder, and after acting upon the piston then to pass out through the exhaust-pipe formed in the rocking shaft and governed by the oscillation of the piston.

It further consists in the construction and combination of parts hereinafter particularly described, and afterward sought to be specifically defined by the claims.

In the accompanying drawings, the letter A indicates the steam-cylinder of semi-cylindrical form, provided with a separately-formed top, B, secured thereto by bolts and nuts, the joints being suitably packed. This top is provided with a pipe, C, for the escape of the steam from the exhaust-port, and about the escape-pipe, on the inside of the cylinder, is made concave, so as to receive a portion of the rocking shaft.

Within the cylinder is an oscillating piston, D, which is journaled by means of the shaft E in suitable bearings or boxes on the sides of the cylinder. I prefer to have one end of the shaft E have its bearings in a recess, *a*, made in one side of the cylinder, while the portion of it near the other end is reduced in diameter and has its bearings in the stuffing-box shown, or in any other one suited to the purpose. If desired, however, both ends of the shaft may project through the ends of the cylinder and have each a pitman, F, connected at one end to a crank on the shaft and at the other end to a crank on the shaft of the fly-wheel G or band-wheel, from which machinery may be driven. When the shaft projects from both sides of the cylinder one end will pass through the steam-chest instead of stopping short inside the cylinder, as illustrated in Fig. 4, and the steam-supply pipe will be changed from the point shown in the drawings to any suitable position in view of the change in the parts, such arrangements of parts readily suggesting themselves to the mind of a skilled machinist.

In the end of the rocking shaft E, at points opposite to each other, so that in the oscillation of the piston first one and then the other will come next to the escape-pipe C, are two steam-induction ports, H, each one extending inwardly, then branching in the direction of the piston, and then running the length of the piston, until it nearly reaches the lower end of the piston, where each opens on the face of the piston along which it runs, as shown in Figs. 3 and 4. Steam enters first one and then the other of these ports through the steam-port *b* in the partition I, which separates the steam-chest from the interior of the cylinder A.

The steam-chest J is formed on the side of cylinder A, and is supplied with steam from the boiler through pipe K. The steam passes out of the lower end of the induction-port and bears against the face of the piston, filling the space between the cylinder and face of the piston, and forcing the piston forward until the other port is brought next to the steam-port *b*, when steam passes into the port on that side of the piston and forces the piston back, and thus the piston is caused to oscillate, and through its rocking shaft and outside connections impart motion to the machine. The port for the exhaust of steam from the cylinder on either face of the piston is formed by a recess, L, in the top of the rocking shaft E, at a point where it will open on top into the steam escape pipe C, and concave thereunder, and it extends transversely across the shaft, so that by the oscillation of the piston it will open first on one side and then the other side of the piston as the piston is moved back and forth.

In a twelve-horse-power engine the exhaust port or recess L is about seven inches in length and one inch in depth. The exhaust-port is made so that when the piston hangs perpendicularly the exhaust is completely cut off, and when it has passed the perpendicular line the exhaust-port will gradually enlarge in size on the side from which the piston is moving until it is fully opened, which is when the piston has made about two-thirds of its stroke. The power of the fly-wheel and force of the stroke carry the piston the remainder of its stroke. On the return-stroke the operation is the same as that just described.

The oscillating piston operates as a cut-off both to the steam-induction port and to the exhaust-port by reason of the construction described.

If it is desired to regulate the stroke of the piston, a disk, M, provided with a port, C, is fitted within the chest J, so as to be next to the partition I, and its shaft extends through a stuffing-box on the side of the chest, where it is provided with a slotted arm, N, in the slot of which fits a pin on the end of a rod, O, the pin being provided with a nut, so that the rod can be held to different adjustments in the slot, the other end of the rod being connected to an eccentric, P, on the fly or band wheel shaft. When the disk is used the port $b$ in partition I is elongated, so that as long as either of the ports in the rocking shaft and the port $e$ in the disk travel together along the slot in the partition for that length of time the steam enters the piston and exerts a pressure on the piston in proportion to the amount of steam which has entered, and the power is correspondingly increased. If it is desired to decrease the power, the rod O is adjusted in the slotted arm N, so as to quicken the movement of the disk over the elongated port in partition, and thereby shorten the time that the steam has to pass through into the induction-ports A, whence results a smaller amount of steam in the steam-cylinder, a correspondingly-reduced pressure on the piston, and a decrease of power. When the disk is used the steam is admitted into the chest through the steam-pipe (shown in dotted lines in Fig. 6) the same as when both ends of the rocking shaft of the piston extend beyond the boxes on both sides of the cylinder.

The principle upon which the piston works is unaffected by the use of the disk, the latter being used only to regulate the force of the stroke. Suitable packings, Q, are set into grooves in the top B, so as to bear against the rocking shaft E about the exhaust-port L, as shown in Figs. 3 and 5. A groove is formed in the edge of the piston, so as to receive any suitable packing.

Instead of using a single piston a double one may be used—that is, there may be two wings inclining in opposite directions, each provided with a port opening at its lower end on the face next to the top B, the two induction-ports in the rocking shaft being the same as in the form illustrated in the drawings, but then there should be two ports, $b$, in the partition I, instead of one, as the stroke of the piston would not be long enough to carry both ports to the one port in the partition. I prefer, however, the form illustrated in the drawings.

By causing the steam to pass from the piston near its lower end a greater leverage is obtained than when admitted into the chamber at its top, and by forming the exhaust as described the back-pressure that exists in the use of a common D-valve is overcome.

Having described my invention, what I claim is—

1. In an engine, the combination, with a cylinder provided with ports for the induction and eduction of steam, of an oscillating piston having a shaft at one end provided with an exhaust-port across its top, both shaft and piston being provided with ports for the inlet of steam through the shaft and its exit on the face of the piston at or near its lower end, whereby, as the piston oscillates, the several parts are adapted to operate as set forth.

2. The cylinder A, provided with induction and eduction ports, in combination with an oscillating piston having induction-ports and an exhaust-port, and a disk, $m$, having an opening through it and an adjustable connection with the rod by which it is operated, by means whereof the size of the steam-induction port in the cylinder is regulated, substantially as and for the purpose set forth.

3. A piston for an oscillating engine, composed of a shaft and a piston-head with induction-ports through the shaft and head and an exhaust-port across the top of the shaft, substantially as set forth.

LAUGHLIN B. GREER. [L. S]

Witnesses:
C. F. GREER,
C. F. KEYS.